US012242090B2

(12) United States Patent
Guillermin et al.

(10) Patent No.: US 12,242,090 B2
(45) Date of Patent: Mar. 4, 2025

(54) MULTI-STAGE OPTICAL ARTICLE (71) Applicant: Transitions Optical, Ltd., Tuam (IE)

(72) Inventors: Sandrine Guillermin, Tuam (IE); Anil Kumar, Murrysville, PA (US)

(73) Assignee: Transitions Optical, Ltd., Tuam (IE)

( * ) Notice: Subject to any disclaimer, the term of this patent is extended or adjusted under 35 U.S.C. 154(b) by 643 days.

(21) Appl. No.: 17/613,712

(22) PCT Filed: May 31, 2019

(86) PCT No.: PCT/EP2019/064188
§ 371 (c)(1),
(2) Date: Nov. 23, 2021

(87) PCT Pub. No.: WO2020/239235
PCT Pub. Date: Dec. 3, 2020

(65) Prior Publication Data
US 2022/0229216 A1 Jul. 21, 2022

(51) Int. Cl.
*G02B 5/23* (2006.01)
*G02C 7/10* (2006.01)

(52) U.S. Cl.
CPC ............. *G02B 5/23* (2013.01); *G02C 7/102* (2013.01)

(58) Field of Classification Search
CPC .......... G02B 5/23; G02C 7/102; G02C 7/105
USPC ................................. 359/237, 238, 240, 241
See application file for complete search history.

(56) References Cited

U.S. PATENT DOCUMENTS

| | | |
|---|---|---|
| 6,926,405 B2 | 8/2005 | Ambler et al. |
| 7,166,357 B2 | 1/2007 | Kumar et al. |
| 8,545,015 B2 | 10/2013 | Kumar et al. |
| 8,582,192 B2 | 11/2013 | Kumar et al. |
| 8,628,685 B2 | 1/2014 | He et al. |
| 8,649,081 B1 | 2/2014 | DeMeio et al. |
| 8,684,524 B2 | 4/2014 | Archambeau et al. |
| 8,828,284 B2 | 9/2014 | Carpenter |
| 8,926,091 B2 | 1/2015 | Kumar et al. |
| 9,310,541 B2 | 4/2016 | Gross et al. |
| 9,334,439 B2 | 5/2016 | DeMeio et al. |
| 9,683,102 B2 | 6/2017 | Cefalo et al. |
| 9,690,021 B2 | 6/2017 | Turpen et al. |
| 9,690,200 B2 | 6/2017 | Hong et al. |
| 10,444,537 B2 | 10/2019 | Kumar et al. |
| 11,543,570 B1 * | 1/2023 | Sears ............... G02B 1/111 |

(Continued)

FOREIGN PATENT DOCUMENTS

| | | |
|---|---|---|
| CN | 102667576 A | 9/2012 |
| CN | 107438514 A | 12/2017 |

(Continued)

*Primary Examiner* — Tuyen Tra
(74) *Attorney, Agent, or Firm* — The Webb Law Firm (57) ABSTRACT

The present invention relates to optical articles that exhibit a uniform first transmittance when directly exposed to actinic radiation, such as sunlight; a gradient second percent transmittance when exposed to actinic radiation that has passed through an actinic radiation blocking or attenuating transparency (such as a vehicle windshield) interposed between the source of actinic radiation and the optical article; and a uniform third percent transmittance when free of exposure to actinic radiation. With the inventive optical articles, the uniform first percent transmittance is less than the uniform third percent transmittance. The present invention also relates to photochromic optical articles.

14 Claims, 3 Drawing Sheets

(56) References Cited

U.S. PATENT DOCUMENTS

| | | |
|---|---|---|
| 2004/0185268 A1 | 9/2004 | Kumar et al. |
| 2014/0272468 A1 | 9/2014 | DeMeio et al. |
| 2014/0334026 A1 | 11/2014 | Gross et al. |
| 2015/0234208 A1 | 8/2015 | De Ayguavives et al. |
| 2019/0291128 A1 | 9/2019 | Zezinka et al. |

FOREIGN PATENT DOCUMENTS

| | | |
|---|---|---|
| EP | 2804030 A1 | 11/2014 |
| GB | 1520099 A | 8/1978 |
| WO | 2012170287 A1 | 12/2012 |
| WO | 2014149852 A2 | 9/2014 |
| WO | 2018010809 A1 | 1/2018 |

\* cited by examiner

MULTI-STAGE OPTICAL ARTICLE

CROSS-REFERENCE TO RELATED APPLICATIONS

This application is the United States national phase of International Application No. PCT/EP2019/064188 filed May 31, 2019, the disclosure of which is hereby incorporated by reference in its entirety.

FIELD OF THE INVENTION

The present invention relates to optical articles that exhibit: a uniform first transmittance when directly exposed to actinic radiation; a gradient second percent transmittance when exposed to actinic radiation that has passed through an actinic radiation blocking or attenuating transparency interposed between the source of actinic radiation and the optical article; and a uniform third percent transmittance when free of exposure to actinic radiation, where the uniform first percent transmittance is less than the uniform third percent transmittance.

BACKGROUND OF THE INVENTION

When exposed to actinic radiation, photochromic compounds typically change from a first state (such as a bleached or first colored state providing a first transmittance) to a second state (such as a second colored state providing a second transmittance that is less than the first transmittance). When free of exposure to actinic radiation, photochromic compounds in the second state (such as the second colored state) will typically convert back to the first state (such as the bleached state). Photochromic compounds, and correspondingly photochromic articles that include such photochromic compounds, have been developed that are capable of reversibly transitioning between the above-described first and second states when an actinic radiation blocking or attenuating transparency (such as a vehicle windshield) is interposed between the photochromic article and the source of actinic radiation. Photochromic articles, such as photochromic optical lenses, which have been developed for use behind a vehicle windshield typically provide a uniform color or uniform level of darkness over the lens. Such a uniform level of color/darkness can be desirable when a user is looking out through the transparency, but can make viewing difficult when looking below the windshield, such as at the dashboard, instrument cluster, audio control system, multimedia display, and/or other items in the vehicle cabin. When outside a vehicle and exposed directly to actinic radiation, a uniform color having a greater uniform level of darkness over the lens is typically desirable. Photochromic articles have been developed, which exhibit a gradient color and gradient level of darkness, advantageously when behind a vehicle windshield, but also less advantageously when outside a vehicle and exposed directly to actinic radiation.

It would be desirable to develop new optical articles, such as photochromic optical articles, that provide both, a uniform color and uniform level of darkness when outside a vehicle and exposed directly to actinic radiation, and a gradient color and gradient level of darkness when behind a UV attenuating transparency. It would be further desirable that such newly developed optical articles, such as photochromic optical articles, also provide a uniform reduced level of darkness (or bleached state) when free of exposure to actinic radiation.

SUMMARY

In accordance with the present invention, there is provided an optical article that exhibits: a uniform first percent transmittance when the photochromic article is tested in the Outdoor Test; a gradient second percent transmittance when the photochromic article is tested in the Behind the Windshield Test; and a uniform third percent transmittance when the optical article is free of exposure to actinic radiation. With the optical article of the present invention, the uniform first percent transmittance is less than the uniform third percent transmittance.

The features that characterize the present invention are pointed out with particularity in the claims, which are annexed to and form a part of this disclosure. These and other features of the invention, its operating advantages and the specific objects obtained by its use will be more fully understood from the following detailed description in which non-limiting embodiments of the invention are illustrated and described.

BRIEF DESCRIPTION OF THE DRAWINGS

In FIGS. 1-3 like characters refer to the same components and/or elements, as the case may be, unless otherwise stated.

DETAILED DESCRIPTION

As used herein, the articles "a", "an", and "the" include plural referents unless otherwise expressly and unequivocally limited to one referent.

Unless otherwise indicated, all ranges or ratios disclosed herein are to be understood to encompass any and all subranges or subratios subsumed therein. For example, a stated range or ratio of "1 to 10" should be considered to include any and all subranges between (and inclusive of) the minimum value of 1 and the maximum value of 10; that is, all subranges or subratios beginning with a minimum value of 1 or more and ending with a maximum value of 10 or less, such as but not limited to, 1 to 6.1, 3.5 to 7.8, and 5.5 to 10.

Other than in the operating examples, or where otherwise indicated, all numbers expressing quantities of ingredients, reaction conditions, and so forth used in the specification and claims are to be understood as modified in all instances by the term "about".

As used herein, molecular weight values of polymers, such as weight average molecular weights (Mw) and number average molecular weights (Mn), are determined by gel permeation chromatography using appropriate standards, such as polystyrene standards.

As used herein, polydispersity index (PDI) values represent a ratio of the weight average molecular weight (Mw) to the number average molecular weight (Mn) of the polymer (i.e., Mw/Mn).

As used herein, the term "polymer" means homopolymers (e.g., prepared from a single monomer species), copolymers (e.g., prepared from at least two monomer species), graft polymers, core-shell polymers, comb polymers, and star polymers.

As used herein, the term "(meth)acrylate" and similar terms, such as "(meth)acrylic acid ester", means methacrylates and/or acrylates. As used herein, the term "(meth)acrylic acid" means methacrylic acid and/or acrylic acid.

As used herein, the term "photochromic" and similar terms, such as "photochromic compound", means having an absorption spectrum for at least visible radiation that varies in response to absorption of at least actinic radiation. Further, as used herein the term "photochromic material" means any substance that is adapted to display photochromic properties (such as, adapted to have an absorption spectrum for at least visible radiation that varies in response to absorption of at least actinic radiation) and which includes at least one photochromic compound.

As used herein, the term "actinic radiation" means electromagnetic radiation that is capable of causing a response in a material, such as, but not limited to, transforming a photochromic material from one form or state to another as will be discussed in further detail herein.

As used herein, the term "photochromic material" includes thermally reversible photochromic materials and compounds and non-thermally reversible photochromic materials and compounds. The term "thermally reversible photochromic compounds/materials" as used herein means compounds/materials capable of converting from a first state, for example a "clear state", to a second state, for example a "colored state", in response to actinic radiation, and reverting back to the first state in response to thermal energy. The term "non-thermally reversible photochromic compounds/materials" as used herein means compounds/materials capable of converting from a first state, for example a "clear state", to a second state, for example a "colored state", in response to actinic radiation, and reverting back to the first state in response to actinic radiation of substantially the same wavelength(s) as the absorption(s) of the colored state (e.g., discontinuing exposure to such actinic radiation).

As used herein to modify the term "state", the terms "first" and "second" are not intended to refer to any particular order or chronology, but instead refer to two different conditions or properties. For purposes of non-limiting illustration, the first state and the second state of a photochromic compound can differ with respect to at least one optical property, such as but not limited to the absorption of visible and/or UV radiation. Thus, according to various non-limiting embodiments disclosed herein, the photochromic compounds of the photochromic articles of the present invention can have a different absorption spectrum in each of the first and second state. For example, while not limiting herein, a photochromic compound of the photochromic articles of the present invention can be clear in the first state and colored in the second state. Alternatively, a photochromic compound of the photochromic articles of the present invention can have a first color in the first state and a second color in the second state.

As used herein the term "optical" means pertaining to or associated with light and/or vision. For example, according to various non-limiting embodiments disclosed herein, the optical article or element or device can be chosen from ophthalmic articles, elements and devices, display articles, elements and devices, windows, mirrors, and active and passive liquid crystal cell articles, elements and devices.

As used herein the term "ophthalmic" means pertaining to or associated with the eye and vision. Non-limiting examples of ophthalmic articles or elements include corrective and non-corrective lenses, including single vision or multi-vision lenses, which can be either segmented or non-segmented multi-vision lenses (such as, but not limited to, bifocal lenses, trifocal lenses and progressive lenses), as well as other elements used to correct, protect, or enhance (cosmetically or otherwise) vision, including without limitation, contact lenses, intra-ocular lenses, magnifying lenses, and protective lenses or visors.

As used herein the term "display" means the visible or machine-readable representation of information in words, numbers, symbols, designs or drawings. Non-limiting examples of display elements include screens, monitors, and security elements, such as security marks.

As used herein the term "window" means an aperture adapted to permit the transmission of radiation therethrough. Non-limiting examples of windows include automotive and aircraft transparencies, windshields, filters, shutters, and optical switches.

As used herein the term "mirror" means a surface that specularly reflects a large fraction of incident light.

As used herein the term "liquid crystal cell" refers to a structure containing a liquid crystal material that is capable of being ordered. A non-limiting example of a liquid crystal cell element is a liquid crystal display.

As used herein, spatial or directional terms, such as "left", "right", "inner", "outer", "above", "below", and the like, relate to the invention as it is depicted in the drawing figures. It is to be understood, however, that the invention can assume various alternative orientations and, accordingly, such terms are not to be considered as limiting.

As used herein, the terms "formed over", "deposited over", "provided over", "applied over", "residing over", or "positioned over" mean formed, deposited, provided, applied, residing, or positioned on but not necessarily in direct (or abutting) contact with the underlying element, or surface of the underlying element. For example, a layer "positioned over" a substrate does not preclude the presence of one or more other layers, coatings, or films of the same or different composition located between the positioned or formed layer and the substrate.

All documents, such as but not limited to issued patents and patent applications, referred to herein, and unless otherwise indicated, are to be considered to be "incorporated by reference" in their entirety.

As used herein, the term "a first photochromic material" means at least one first photochromic material. When two or more first photochromic materials are present, they together have and provide a (e.g., an average) first unactivated state absorbance of greater than 0 over a particular wavelength range, and a (e.g., an average) first unactivated state terminal minimum absorbance wavelength.

As used herein, the term "a second photochromic material" means at least one second photochromic material. When two or more second photochromic materials are present, they together have and provide a (e.g., an average) second unactivated state absorbance of greater than 0 over a particular wavelength range, and a (e.g., an average) second unactivated state terminal minimum absorbance wavelength.

As used herein, the term "unactivated state" with regard to photochromic materials, such as the first photochromic material and the second photochromic material, means the photochromic material has: (i) measurable absorbance at wavelengths of greater than or equal to 330 nm and less than or equal to 450 nm, such as less than or equal to 430 nm, or less than or equal to 410 nm; and (ii) minimal or substantially no measurable absorbance at wavelengths of greater than 450 nm.

As used herein, the term "activated state" with regard to photochromic materials, such as the first photochromic material, the second photochromic material, and photochromic articles, means the photochromic material and/or photochromic article has been exposed to actinic radiation having sufficient energy to result in the photochromic material and/or photochromic article having or producing measurable absorbance: (i) at wavelengths including at least some of the wavelengths of the unactivated state; and (ii) at wavelengths greater than those of the unactivated state.

As used herein, the term "a first unactivated state absorbance of greater than 0" over at least a portion of a certain wavelength range, such as "over at least a portion of (or all) wavelengths from 375 nm to 450 nm" means the first photochromic material has an unactivated state absorbance of greater than 0 over at least a portion of a certain wavelength range, such as at least a portion of wavelengths from 375 nm to 450 nm.

As used herein, the term "a first unactivated state terminal minimum absorbance wavelength" means the wavelength at which the first photochromic material (of the first layer) in an unactivated state, has a terminal (or upper) minimum absorbance.

As used herein, the term "a second unactivated state absorbance of greater than 0" over at least a portion of a certain wavelength range, such as "over at least a portion of wavelengths from 340 nm to less than 400 nm" means the second photochromic material (of the second layer) has an unactivated state absorbance of greater than 0 over at least a portion of a certain wavelength range, such as over at least a portion of wavelengths from 340 nm to less than 400 nm, such as from 340 nm to 390 nm, such as from 340 nm to 380 nm, such as from 350 nm to 380 nm.

As used herein, the term "over at least a portion of wavelengths from x nm to y nm" with regard to an unactivated state absorbance of greater than 0, means over at least a portion of consecutive wavelengths within the recited range, inclusive of the recited upper and lower wavelength values.

As used herein, the term "a second unactivated state terminal minimum absorbance wavelength" means the wavelength at which the second photochromic material (of the second layer), in an unactivated state, has a terminal (or upper) minimum absorbance.

As used herein, and unless otherwise indicated, "percent transmittance" was determined using a suitable instrument, such as a Spectrum Detective SD2400 transmission meter, commercially available from EDTM, Inc., in accordance with instructions provided in the spectrometer user manual.

The Behind the Windshield Test and the Outdoor Test are described in further detail in Part 4 of the Examples herein. In summary, test specimens that are representative of the photochromic articles of the present invention, are tested for photochromic response: (i) in the absence of exposure to actinic radiation; (ii) with a simulated windshield interposed between the test specimen and the source of actinic radiation, under conditions simulating an eyeglass wearer behind an automotive windshield, in the Behind the Windshield Test (BWS); and (iii) under conditions simulating outdoor exposure in the Outdoor Test (OS). In each case, the test specimens are observed visually with regard to an observed: lack of color; uniform color development; or gradient color development.

As used herein, the term "uniform percent transmittance" and related terms, such as "uniform first percent transmittance" and "uniform third percent transmittance" means a uniform (or constant) percent transmittance over (such as relative to the face of) the photochromic article. For purposes of non-limiting illustration, when the photochromic article is a photochromic optical lens, such as a photochromic ophthalmic lens, the term "uniform percent transmittance" means that when measured at two or more points over or relative to the face of the lens (such as from the top to the bottom of the face of the lens), the lens has a uniform percent transmittance. With some embodiments, the term "uniform percent transmittance" means having a variation in percent transmittance, such as measured over a plurality of points over the face of the photochromic article, of less than or equal to 0.5 percent, such as less than or equal to 0.25 percent, such as less than or equal to 0.1 percent, such as less than or equal to 0.05 percent, the percent values each being as between any two measurement points.

As used herein, the term "gradient percent transmittance" and related terms, such as "gradient second percent transmittance" means a gradient increase or decrease in percent transmittance along a line over (such as relative to the face of) the optical article. For purposes of non-limiting illustration, when the optical article is a photochromic optical lens, such as a photochromic ophthalmic lens, the term gradient percent transmittance" and related terms, such as "gradient second percent transmittance" means that when a plurality of measurements are taken along a line extending from an upper portion (or end) to a bottom portion (or end) of the face of the lens, the percent transmittance increases in a gradient (or gradiently) along the line of measurements; and correspondingly, the percent transmittance decreases in a gradient (or gradiently) in the opposite direction along the same line of measurements. The gradient change in percent transmittance along the line of measurements (as a function of linear distance along the line of measurements), with some embodiments, can: be linear; be non-linear, such as exponential; include one or more plateaus; or be composed of a combination of two or more thereof.

As used herein, the term "actinic radiation blocking" and related terms, such as "actinic radiation attenuating", "actinic radiation blocking transparency", and "actinic radiation attenuating transparency" means at least some, but less than all, of the incident actinic radiation is blocked or attenuated, such as by a transparency, such as, but not limited to, a vehicle windshield.

With some embodiments of the present invention, the uniform first transmittance is from 5 percent to 25 percent, such as from 6 percent to 22 percent, such as from 8 percent to 20 percent.

With some embodiments of the present invention, the uniform third transmittance is from 40 percent to 95 percent, such as from 60 percent to 92 percent, such as from 80 percent to 90 percent.

The uniform first percent transmittance is less than the uniform third percent transmittance. With some embodiments, the uniform first percent transmittance is less than the uniform third percent transmittance by an absolute value of from 35 to 70, such as from 54 to 70, where each absolute value is determined by subtracting the uniform first percent transmittance from the uniform third percent transmittance.

The optical article, with some embodiments, is an electrochromic optical article that provides the uniform first percent transmittance, gradient second percent transmittance, and uniform third percent transmittance as described previously herein.

The optical article, with some further embodiments, is a photochromic optical article that provides the uniform first percent transmittance, gradient second percent transmittance, and uniform third percent transmittance as described previously herein.

The optical article, with some embodiments of the present invention, is a photochromic optical article that includes: (a) a substrate; and (b) a first layer positioned over the substrate, where the first layer includes a first photochromic material having a first unactivated state terminal minimum absorbance wavelength. The photochromic optical article further includes, with some embodiments, (c) a second layer positioned over the first layer, where the second layer includes a second photochromic material having a second unactivated state terminal minimum absorbance wavelength. The second unactivated state terminal minimum absorbance wavelength is less than the first unactivated state terminal minimum absorbance wavelength. In addition, the first layer provides the gradient second percent transmittance when the photochromic optical article is tested in the Behind the Windshield Test, and the second layer provides the uniform first percent transmittance when the photochromic optical article is tested in the Outdoor Test.

With some embodiments of the photochromic optical article of the present invention, the first photochromic material has a first unactivated state absorbance of greater than 0 over at least a portion of wavelengths from 375 nm to 450 nm, and the first unactivated state terminal minimum absorbance wavelength is greater than 400 nm; and the second photochromic material has a second unactivated state absorbance of greater than zero over at least a portion of wavelengths from 340 nm to less than 420 nm, and the second unactivated state terminal minimum absorbance wavelength is less than or equal to 415 nm.

With some further embodiments of the present invention, the first unactivated state terminal minimum absorbance wavelength (of the first photochromic material) is greater than 415 nm and less than or equal to 450 nm; and the second unactivated state terminal minimum absorbance wavelength (of the second photochromic material) is greater than 375 nm and less than or equal to 415 nm.

Figure 3:
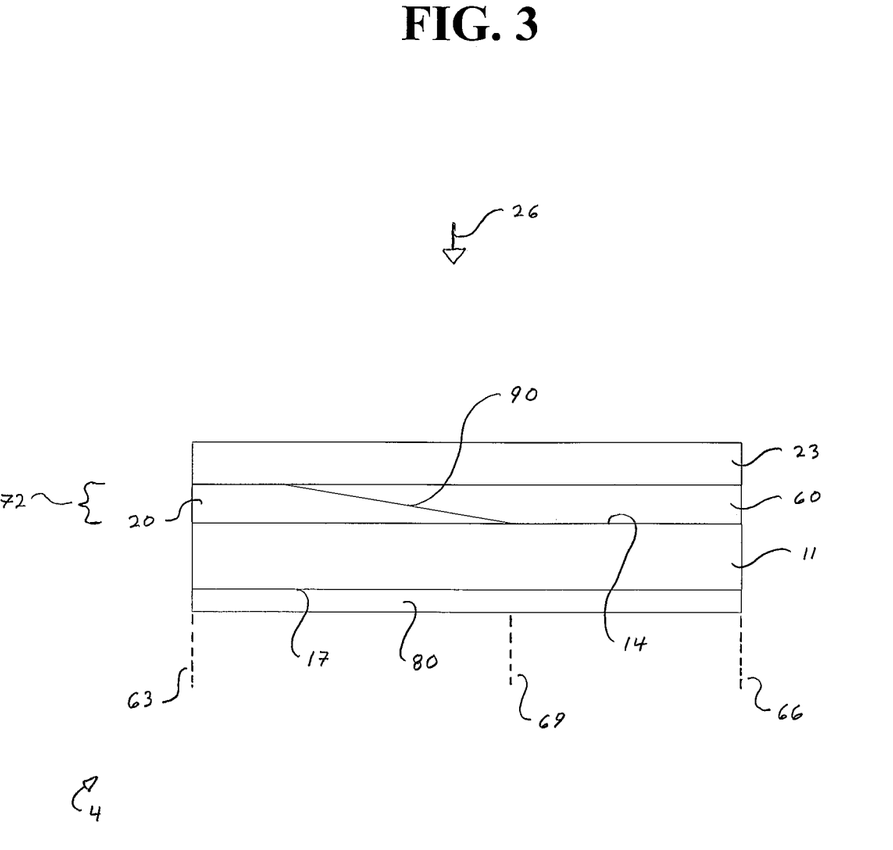
FIG. 3 is a representative side elevation sectional view of an optical article in the form of a photochromic optical article according to some embodiments of the present invention.

For purposes of non-limiting illustration and with reference to FIG. 3 of the drawings, there is depicted an example of an optical article 4 in the form of a photochromic optical article 4 according to some embodiments of the present invention. Photochromic article 4 includes a substrate 11 having a first (or forward) surface 14 and a second (or rear) surface 17, in which the first 14 and second 17 surfaces are opposed to each other. First surface 14 of substrate 11 faces incident actinic radiation depicted by arrow 26. Photochromic optical article 4 further includes a first layer 72 that is composed of: a first portion 20 that includes the first photochromic material; and a second portion 60 that is free of photochromic material. First portion 20, which includes the first photochromic material, in accordance with some embodiments and as depicted illustratively in FIG. 3, can have a gradient pattern of the first photochromic material. For purposes of explanation, the gradient pattern is represented by line 90. The gradient pattern can be, for example, a concentration gradient of the first photochromic material in the first layer 72. For example, the concentration of the first photochromic material in the first layer 72 can decrease from a maximum towards a first end 63 of substrate 11 to a minimum towards a second end 66 of substrate 11. For example, the concentration of the first photochromic material can decrease from a maximum at or near the first end 63 to a minimum at or about the middle 69 of substrate 11.

Alternatively, the gradient pattern can be a thickness gradient. First portion 20 of first layer 72 can be in abutting relationship with a portion of first surface 14 of substrate 11. Second portion 60 of first layer 72 can be positioned over (e.g., in abutting relationship with) with at least a portion of underlying first portion 20 and over at least a portion of first surface 14 of substrate 11. In accordance with some embodiments and as depicted illustratively in FIG. 3, at least a portion of second portion 60 of first layer 72 can have a gradient thickness that decreases from a maximum towards the second end 66 to a minimum towards the first end 63 of substrate 11 (e.g., over the first portion 20). With some embodiments, second portion 60 of first layer 72 is a clear coat (e.g., formed from a coating material including no colorants). The first layer 72 can have a substantially uniform thickness.

Photochromic optical article 4, of FIG. 3, includes a second layer 23 which is positioned over (e.g., in abutting relationship with) underlying first layer 72. Second layer 23 includes the second photochromic material. Second layer 23, in accordance with some embodiments, and as depicted illustratively in FIG. 3, can have a substantially uniform thickness, e.g., from first end 63 to second end 66 of substrate 11. Second layer 23, in accordance with some embodiments, can have a substantially uniform concentration of the second photochromic material e.g., from first end 63 to second end 66 of substrate 11.

Figure 1:
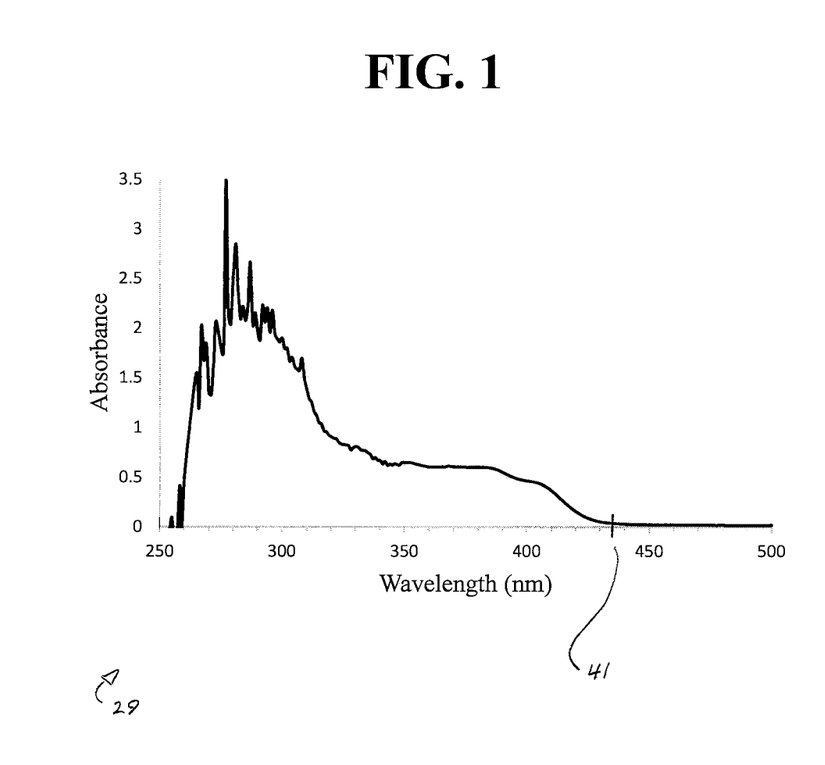
FIG. 1 is a graphical representation of a plot of absorbance vs. wavelength for Coating Formulation 2 of the Examples, which was diluted 500 times in N-methyl pyrrolidone, and measured using a Cary 300 US-visible spectrophotometer from Agilent Technologies, Inc.
Figure 2:
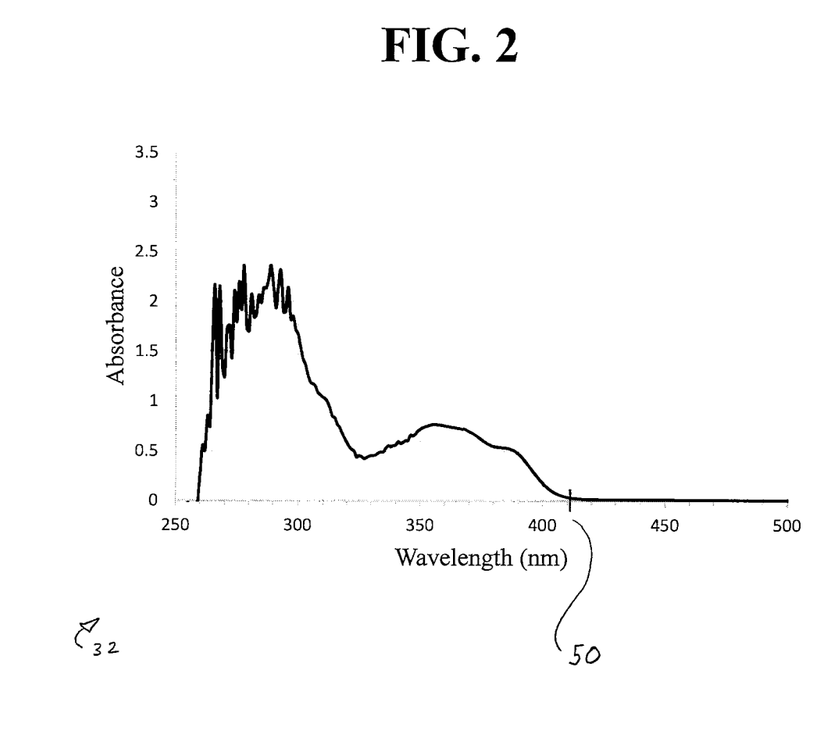
FIG. 2 is a graphical representation of a plot of absorbance vs. wavelength for Coating Formulation 3 of the Examples, which was diluted 500 times in N-methyl pyrrolidone, and measured using a Cary 300 US-visible spectrophotometer from Agilent Technologies, Inc.

The first photochromic material of first portion 20 of first layer 72 of photochromic optical article 4 of FIG. 3 can have absorbance properties represented by graph 29 of FIG. 1, which is a plot of absorbance vs. wavelength for a first photochromic material. With reference to representative graph 29, the first photochromic material can have a first unactivated state terminal minimum absorbance wavelength 41 of about 435 nm. The second photochromic material of second layer 23 of photochromic article 4 of FIG. 3 can have absorbance properties represented by graph 32 of FIG. 2, which is a plot of absorbance vs. wavelength for a second photochromic material. With reference to graph 32, the second photochromic material can have a second unactivated state terminal minimum absorbance wavelength 50 of about 410 nm.

The first layer 72 of the photochromic optical article 4 provides the gradient second percent transmittance when the photochromic optical article 4 is tested in the Behind the Windshield Test. The second layer 23 of the photochromic optical article 4 provides the uniform first percent transmittance when the photochromic optical article 4 is tested in the Outdoor Test. The uniform third percent transmittance is provided by the photochromic optical article 4 as a whole when the photochromic optical article 4 is free of exposure to actinic radiation.

Without intending to be bound by any theory, it is believed, based on the evidence at hand, that when tested in the Outdoor Test, the second photochromic material of the second layer 23 is activated and thereby provides the uniform first percent transmission of the photochromic optical article 4. When so activated in the Outdoor Test, the second photochromic material of the second layer 23 also blocks (or prevents) substantially actinic radiation from reaching the first photochromic material of the underlying first layer 72, thus preventing substantially (or minimizing) activation of the first photochromic material.

Without intending to be bound by any theory, it is believed, based on the evidence at hand, that when tested in the Behind the Windshield Test, the second photochromic material of the second layer 23 is substantially free of activation, due to the simulation windshield blocking wavelengths of light (actinic radiation) that would otherwise activate the second photochromic material. With the second photochromic material of the second layer 23 substantially free of activation (in the Behind the Windshield Test) actinic radiation (attenuated by passing through the simulation windshield) passes through the second layer 23 and activates the first photochromic material of the underlying first layer 72.

With some embodiments of the photochromic optical article 4, the first layer 72 has a gradient pattern of the first photochromic material. The first photochromic material being present in a gradient pattern, when activated by exposure to actinic radiation, provides the gradient pattern of the photochromic article 4.

The first layer 72 can be provided with a gradient pattern of the first photochromic material in accordance with art-recognized methods, such as, but not limited to: dip (or partial immersion) coating methods; spray methods; micro jet coating methods (such as ink jet coating methods, where, with some embodiments, the ink of the ink jet coating apparatus is replaced with a composition including the first photochromic compound); and combinations of such methods. For example, the first layer 72 can be formed using a spray coater. A first coating solution comprising the first photochromic material (to form the first portion 20) can be mixed at the spray nozzle with a second coating solution free of the first photochromic material (to form the second portion 60). The amounts of the two coating solutions can be varied as the coatings are applied onto the substrate 11 to provide the gradient (e.g., gradient concentration) of the first coating material, i.e. to form the first portion 20 and the second portion 60. An example of such a coating method is disclosed in paragraphs [0110] through [0114] of Example 1 of WO 2018/010809 A1.

When the photochromic optical article 4 of the present invention is an ophthalmic article, such as a corrective lens or non-corrective lens, and in accordance with some embodiments, the gradient pattern of the first photochromic compound of the first layer 72 is provided and oriented such that there is higher concentration of first photochromic material at the top of the lens (such as, above the eye of the wearer) and a lower concentration of (including no) first photochromic material at the bottom of the lens (such as, below the eye of the wearer). When present in such a gradient pattern and activated, the first photochromic material of the first layer 72 provides a gradient second percent transmittance, in which the percent transmittance at the top of the lens is less, and the percent transmittance at the bottom of the lens is greater (relative to each other).

The first photochromic material of the first layer 72, with some embodiments, is selected from a first photochromic compound, a first photochromic-dichroic compound, and combinations thereof. With some further embodiments, the second photochromic material of the second layer 23 is selected from a second photochromic compound, a second photochromic-dichroic compound, or combinations thereof.

As used herein, the term "dichroic" and similar terms, such as "dichroism", means the ability to absorb one of two orthogonal plane polarized components of radiation (including transmitted and/or reflected radiation) more strongly than the other orthogonal plane polarized component. Photochromic-dichroic materials possess both photochromic properties and dichroic properties. A photochromic-dichroic material, in some instances, can be described as including a photochromic molecule (or core, or moiety) to which is covalently attached at least one lengthening group that includes at least one mesogen (or mesogenic) segment. A mesogen is typically described as the primary or fundamental unit (or segment or group) of a liquid crystal material that induces, and/or is induced into, structural order amongst and between liquid crystals (such as, other liquid crystal materials and/or other mesogen segments that are present). Ordering of the lengthening groups of photochromic-dichroic compounds results, in some embodiments, a molecular structure having optical anisotropy. The dichroic properties of photochromic-dichroic compounds are believed to be due to the optical anisotropy resulting from alignment of the lengthening groups of the photochromic-dichroic compounds. With some embodiments, a mesogen segment includes two or more divalent cyclic groups selected from divalent cycloaliphatic groups and/or divalent aromatic groups.

In accordance with some embodiments of the photochromic optical article of the present invention, at least one of: (i) the first photochromic-dichroic compound (of the first layer) is at least partially aligned; (ii) the second photochromic-dichroic compound (of the second layer) is at least partially aligned; or (ii) the first photochromic-dichroic compound (of the first layer) and the second photochromic-dichroic compound (of the second layer) are each independently at least partially aligned. The alignment of the first photochromic-dichroic compound (of the first layer), or first alignment, and the alignment of the second photochromic-dichroic compound (of the second layer), or second alignment can be: parallel relative to each other; non-parallel, such as having a relative angle (as between the first alignment and the second alignment) of greater than 0° and less than or equal to 90°, such as from 10° to 90°, such as from 20° to 80°, such as from 25° to 75°.

The first and second photochromic-dichroic compounds can each be independently aligned in accordance with art-recognized methods, such as direct methods, such as by the application of shear force, or indirectly, such as by exposure to at least one of a magnetic field, an electric field, and/or linearly polarized radiation. With some embodiments, the first and second photochromic-dichroic compounds are each independently aligned by abutment with an alignment layer, which is typically an underlying alignment layer. The first photochromic-dichroic compound(s) of the first layer can be aligned by a first alignment layer that is interposed between the substrate and the first layer, and in abutting relationship with the first layer. The second photochromic-dichroic compound(s) of the second layer can be aligned by a second alignment layer that is interposed between the first layer and the second layer, and in abutting relationship with the second layer. The first and second alignment layers can each be independently aligned by exposure to at least one of a magnetic field, an electric field, linearly polarized radiation, shear force, or combinations of two or more thereof. Alignment of the alignment layer results in alignment of the photochromic-dichroic material of the layer associated therewith (such as in abutment therewith). Classes and examples of materials that can be used as or to form each alignment layer include, but are not limited to, the orientation facilities, orientation materials, alignment media, and alignment facilities described at: column 5, line 5 through column 6, line 4; column 7, line 56 through column 24, line 36; and the examples of U.S. Pat. No. 8,926,091 B2, which disclosure is incorporated herein by reference.

In accordance with some embodiments, the first photochromic material and the second photochromic material are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations of two or more thereof.

In accordance with some further embodiments of the present invention, the photochromic moiety or core of the first photochromic-dichroic compound and the photochromic moiety or core of the second photochromic-dichroic compound (to which, in each case, at least one lengthening group is independently covalently bonded) are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations of two or more thereof.

Classes and examples from which each lengthening group, of the first photochromic-dichroic compounds and second photochromic-dichroic compounds of the first and second layers of the photochromic optical article of the present invention, can each be independently selected, include, but are not limited to, those described at columns 37-51 of U.S. Pat. No. 9,334,439 B2, which disclosure is incorporated herein by reference.

The optical article 4 of the present invention can, with some embodiments, include one or more additional layers, such as, but not limited to, primer layer(s), topcoat layer(s), antireflective layer(s), hardcoat layer(s), polarizing layer(s), and alignment layer(s). Classes and examples of such additional optional layers are described at column 20, line 30 through column 21, line 38 of U.S. Pat. No. 8,828,284 B2, which disclosure is incorporated herein by reference.

The first layer 72 and the second layer 23 of the photochromic optical article, with some embodiments of the present invention, can each independently include at least one additive selected from dyes, alignment promoters, kinetic enhancing additives, photoinitiators, thermal initiators, polymerization inhibitors, solvents, light stabilizers, heat stabilizers, mold release agents, rheology control agents, leveling agents, free radical scavengers, adhesion promoters, blue light blockers, or combinations of two or more thereof. Classes and examples of blue light blocking (or filtering) agents include, but are not limited to, those described in U.S. Pat. No. 9,683,102 B2 and US 2015/0234208 A1, the pertinent portions of which are incorporated herein by reference.

With some embodiments, the first layer 72 and the second layer 23 can each independently include a dichroic dye. Examples of dichroic dyes that can be included in the first and/or second layers of the photochromic optical article of the present invention include, but are not limited to, azomethines, indigoids, thioindigoids, merocyanines, indans, quinophthalonic dyes, perylenes, phthaloperines, triphenodioxazines, indoloquinoxalines, imidazo-triazines, tetrazines, azo and (poly)azo dyes, benzoquinones, naphthoquinones, anthroquinone and (poly)anthroquinones, anthropyrimidinones, iodine, iodates, or combinations of two or more thereof.

With some embodiments of the photochromic optical article 4 of the present invention: the substrate 11 includes a first surface 14 and a second surface 17, in which the first surface 14 and the second surface 17 are opposed to each other; the first layer 72 is positioned over at least a portion of the first surface 14 of the substrate 11; and, optionally, the photochromic article 4 further includes a back-layer 80 that includes an ultraviolet light absorber, in which the back-layer 80 is positioned over the second surface 17 of the substrate 11. For purposes of non-limiting illustration, and with reference to FIG. 3, the back layer 80 is, with some embodiments, positioned over second surface 17 of substrate 11. Examples of ultraviolet light absorbers that can be included in the back layer 80 include, but are not limited to, TINUVIN ultraviolet light absorbers, which are commercially available from BASF Corporation.

While not intending to be bound by any theory, it is believed that the back layer 80, which includes an ultraviolet light absorber(s), prevents or minimizes actinic radiation, such as reflected actinic radiation, from passing through the second (or back) surface 17 of the substrate and activating the first photochromic material of the first layer 72. For purposes of non-limiting illustration, when the photochromic optical article is a photochromic ophthalmic lens that is worn on a wearer's face, actinic radiation (such as sunlight), can be reflected off the face of the wearer and pass through the second (or back) surface 17 of the substrate 11 of the photochromic ophthalmic lens and into the first layer 72. In the absence of the back layer 80, the reflected actinic radiation (such as ultraviolet light) passing through the second (or back) surface 17 of the substrate 11 and into the first layer 72 can undesirably activate the first photochromic material, such as when worn outdoors (without an interposed actinic radiation blocking/absorbing transparency, such as a windshield).

The first layer 72, the second layer 23, and any additional optional layers (including the back layer 80) provided over the substrate of the photochromic optical articles of the present invention each independently include, with some embodiments, an organic matrix, such as an organic polymer matrix, which can be a cured (or crosslinked) organic matrix, a thermoplastic organic matrix, or a combination of thereof. Correspondingly, each layer (including the first and second layers) of the photochromic optical articles of the present invention can each be independently selected from cured (or crosslinked) layers and thermoplastic layers. The organic matrix of each layer of the photochromic optical articles of the present invention can each independently include linkages such as, but not limited to: ether linkages; carboxylic acid ester linkages; urethane linkages; amide linkages; urea linkages; carbonate linkages; linkages formed from the radical polymerization of radically polymerizable ethylenically unsaturated groups, such as, but not limited to, vinyl groups, allyl groups, and/or (meth)acrylate groups; and combinations of two or more thereof.

Each layer (including the first layer 72 and second layer 23) of the photochromic optical articles of the present invention can be formed by art-recognized methods, such as, but not limited to, lamination methods and coating methods. Coating methods include, but are not limited to: spray coating methods; spin coating methods; curtain coating methods; dip coating methods; micro jet coating methods (such as ink jet coating methods); in-mold coating methods; and combinations thereof. Lamination methods include, but are not limited to: extrusion lamination methods (such as directly over the substrate); in-mold lamination methods (in which a laminate is placed in a mold, and the substrate is formed there-against within the mold); thermal lamination methods (in which a laminate is thermally fused over the substrate); adhesive lamination methods (in which the laminate is adhered over the substrate by an interposed adhesive layer); and combinations thereof.

The substrate 11 of the photochromic optical article, with some embodiments, is an optical substrate, which can include organic materials (such as organic polymers), inorganic materials, or combinations thereof (for example, composite materials). Examples of substrates that can be included in the photochromic optical articles of the present invention include, but are not limited to, those described at column 35, line 5 through column 36, line 57 of U.S. Pat. No. 8,628,685 B2, which disclosure is incorporated herein by reference.

With some embodiments, the photochromic optical article is selected from ophthalmic articles, display articles, windows, mirrors, and active liquid crystal cell articles, and passive liquid crystal cell articles.

With some further embodiments, the photochromic optical article is selected from ophthalmic articles, and the ophthalmic articles are selected from corrective lenses, non-corrective lenses, contact lenses, intra-ocular lenses, magnifying lenses, protective lenses, and visors.

The present invention is more particularly described in the following examples, which are intended to be illustrative only, since numerous modifications and variations therein will be apparent to those skilled in the art. Unless otherwise specified, all parts and all percentages are by weight.

EXAMPLES

In Part 1 of the following examples, the preparation of Coating Formulations 1, 2, and 3 is described. In Part 2 there is described the preparation of test specimens representative of photochromic optical articles according to the present invention, using Coating Formulations 1, 2, and 3. In Part 3, testing and evaluation of the test specimens of Part 2 is described. In Part 4, the Behind the Windshield Test and the Outdoor Test as used in Part 3 are described.

Part 1

Coating Formulation 1

A curable clear polyurethane composition was prepared using the components and relative amounts thereof as recited in Table 1 at column 31 of U.S. Pat. No. 9,690,021 B2, without the addition of the magenta dye and photochromic dyes. Table 1 of U.S. Pat. No. 9,690,021 B2, without the magenta dye and photochromic dyes, is provided as follows:

TABLE 1

| Component | Weight % |
|---|---|
| N-Methyl pyrrolidone (NMP) | 28.321 |
| Acrylic polyol[1] | 17.770 |
| DURANOL ® T5652[2] | 16.040 |
| TRIXENE ® BI7960[3] | 30.603 |
| K-KAT ® 348[4] | 0.483 |
| BYK ® 333[5] | 0.036 |
| SILQUEST ® A-187[6] | 1.914 |
| TINUVIN ® 144[7] | 0.966 |
| IRGANOX ® 245[8] | 0.966 |

[1] Made from free radical polymerization of Hydroxypropyl methacrylate (40.4%), Butyl methacrylate (57.6%) and Acrylic acid (2.0%) with a number average molecular weight of 5500 as determined by GPC with polystyrene standard and tetrahydrofuran diluent. Material reduced to 61% solids using dipropylene glycol methyl ether acetate.
[2] Polycarbonate diol from Asahi Kasei
[3] Dimethyl pyrazole blocked hexane diisocyanate biuret from Baxenden
[4] Bismuth carboxylate catalyst from King Industries
[5] Surfactant from BYKChemie
[6] Epoxy silane adhesion promoter from Momentive
[7] Hindered Amine light stabilizer available from BASF Company.
[8] Antioxidant available from BASF Company.

Coating Formulation 2

A curable photochromic polyurethane composition was prepared according to Coating Formulation 1, but with the addition of a blend of photochromic dyes that provided an unactivated state terminal minimum absorbance wavelength of about 435 nm. See FIG. 1 of the drawings, and in particular, character 41 thereof. The blend of photochromic dyes provided a neutral grey color in the activated state.

Coating Formulation 3

A curable photochromic polyurethane composition was prepared according to Coating Formulation 1, but with the addition of a blend of photochromic dyes that provided an unactivated state terminal minimum absorbance wavelength of about 410 nm. See FIG. 2 of the drawings, and in particular, character 50 thereof.

Part 2

A photochromic optical article test specimens according to the present invention were prepared, using Coating Formulations 1, 2, and 3, as follows.

Plano polycarbonate lens substrates were cleaned using isopropyl alcohol and then subjected to corona surface treatment using a Tantec Lab corona system Model HT-XI-28-02.

A gradient first photochromic coating layer was formed over a surface (one side) of the corona surface treated plano polycarbonate lens substrates using the procedures described in paragraphs [0110] through [0114] of Example 1 of WO 2018/010809 A1. For this procedure, Coating Formulation 2 was used in place of the photochromic T7 Grey Coating solution, and Coating Formulation 1 diluted 2:1 with methylisobutyl ketone was used as the clear coating.

The plano polycarbonate lens substrates having the gradient first photochromic coating layer over a surface thereof, as described in the preceding paragraph, were cured in an electric oven for 90 minutes at a temperature of 125° C.

A uniform second photochromic coating layer was formed over the cured gradient first photochromic coating layer by applying Coating Formulation 3 thereover at a coating weight of 0.32 grams, followed by curing of the applied Coating Formulation 3 at a temperature of 125° C. for 90 minutes in an electric oven, which resulted in test specimens that were representative of photochromic optical articles according to the present invention.

Part 3

The test specimens of Part 2 were tested and evaluated as follows.

The test specimens were tested using the Behind the Windshield Test and Outdoor Test as described in Part 4 below. After activation the test specimens were evaluated visually with regard to an observed: lack of color; uniform color development; or gradient color development.

Prior to testing, the test specimens were observed to be transparent and colorless (being representative of a third percent transmittance when free of exposure to actinic radiation). The test specimens were subjected to the exposure conditions of the Behind the Windshield Test, immediately after which the test specimens were removed and visually inspected. The test specimens were visually observed to have a gradient color, having a darker color in the area corresponding to Coating Formulation 2, and colorless in the area corresponding to Coating Formulation 1. Transmission testing of the gradient test specimens was conducted using a Spectrum Detective SD2400 transmission meter, commercially available from EDTM, Inc. The test specimens exposed in accordance with the Behind the Windshield Test, and while presenting a gradient color, were found to have a transmittance of 41% in the darkest area, and a transmittance of 73% in the most colorless area (being representative of a gradient second percent transmittance when tested in the Behind the Windshield Test).

The test specimens were next subjected to the exposure conditions of the Outdoor Test. Immediately after the Outdoor Test exposure, the test specimens were removed and visually inspected, and observed to have a substantially uniform dark gray color, which was determined to have a transmittance of 18% (using a Spectrum Detective SD2400 transmission meter model), and being representative of a uniform first percent transmittance when tested in the Outdoor Test.

Part 4

The Outdoor Test and the Behind the Windshield test utilized in the present examples are described in further detail as follows.

The Outdoor Test (also referred to as the Outdoor Simulation (OS) Test) is described as follows.

The test specimens prepared as described in Part 2 were tested for photochromic response in the Outdoor Simulation (OS) Test as described herein on an Advance Bench for Measuring Photochromics (A-BMP) custom made by PPG. Prior to testing on the A-BMP, the test specimens were conditioned by activating and fading as described hereinafter. The test specimens were first exposed to 365 nanometer ultraviolet light for approximately 10 minutes at a distance of 14 centimeters to activate the photochromic compounds. The UVA (315 to 380 nm) irradiance at the test specimen was measured with a Licor Model Li-1800 spectroradiometer and found to be 22.2 watts per square meter. The activated test specimens were then placed under a 500 watt, high intensity halogen lamp for approximately 10 minutes at a distance of 36 centimeters to bleach or inactivate the photochromic compounds. The illuminance at the test specimens was measured with the Licor spectroradiometer and found to be 21.4 Klux. The test specimens were then kept covered for at least 1 hour prior to testing on an A-BMP.

The A-BMP was fitted with two 150 watt Xenon arc lamps positioned 90° apart (one lamp to provide the amount of UV/VIS light (Lamp 1) and one to provide the additional contribution of visible light (Lamp 2)). The collimated output beams from the Xenon arc lamps were combined and directed toward the sample cell through a 50/50 beam splitter. Each lamp was filtered and shuttered individually and also shuttered after blending, prior to entering the temperature controlled sample chamber. The light path from Lamp 1 was directed through a 3 mm Schott KG-2 band-pass filter and appropriate neutral density filters that contributed to the required UV and partial VIS light irradiance level. The light path from the Lamp 2 was directed through a 3 mm Schott KG-2 band-pass filter, a 400 nm cutoff filter and neutral density filters in order to provide supplemental VIS light illuminance. Proprietary software was used on the A-BMP to control timing, irradiance intensity, sample chamber temperature, shuttering, filter selection and response measurement. A Zeiss spectrophotometer, Model MCS 601, with fiber optic cables for light delivery through the test specimen was used for response and color measurement. The test specimen within the sample chamber was controlled at a temperature of 23+/−0.2° C. using an FTS™ Systems AirJet™ XE maintained at 3.5 cfm pressure flow through the sample chamber.

Testing was conducted using conditions simulating the average photochromic lens response on a wearer when outdoors at the specified temperature or a value of 6.7 Watts/m$^2$ (UVA) integrated between 315 and 380 nm and 50 Klux. After completion of the Outdoor Test, the test specimens were observed visually, and the appearance thereof was recorded, such as with regard to having a substantially uniform color.

The Behind the Windshield Test is described as follows.

The test specimens were tested in the Behind the Windshield (BWS) Test using the A-BMP described above (with regard to the Outdoor Test) with conditions simulating photochromic lens response on a wearer inside an automobile. It was determined that the amount of light energy available to activate a photochromic lens on a wearer in an automobile was 0.75 Watts/m$^2$ integrated between 380 and 420 nm and 1.7 Klux (kilolumens/m$^2$). These conditions were attained using only Lamp 1 with a direct irradiance path to the sample. In this irradiance path, the 3 mm Schott KG-2 band-pass filter and a simulated windshield were used to attain the irradiance spectral profile. The simulated windshield was prepared by laminating a 0.73 mm thick piece of polyvinylbutyrate film from Solutia Inc. between two 2.3 mm thick layers of Solex 97 glass from PPG Industries, Inc. The simulated windshield had a total thickness of 5.33 mm. After completion of the Behind the Windshield Test, the test specimens were observed visually, and the appearance thereof was recorded, such as with regard to having a gradient color pattern.

The present invention can be further characterized by one or more of the following non-limiting clauses.

Clause 1: An optical article that exhibits a uniform first percent transmittance when the optical article is tested in the Outdoor Test; a gradient second percent transmittance when the optical article is tested in the Behind the Windshield Test; and a uniform third percent transmittance when the optical article is free of exposure to actinic radiation, wherein the uniform first percent transmittance is less than the uniform third percent transmittance.

Clause 2: The optical article of clause 1, wherein the optical article is a photochromic optical article.

Clause 3: The optical article of clauses 1 or 2 comprising:
(a) a substrate;
(b) a first layer positioned over the substrate, the first layer comprising a first photochromic material having a first unactivated state terminal minimum absorbance wavelength; and
(c) a second layer positioned over the first layer, the second layer comprising a second photochromic material having a second unactivated state terminal minimum absorbance wavelength,
wherein the second unactivated state terminal minimum absorbance wavelength is less than the first unactivated state terminal minimum absorbance wavelength, and wherein the first layer provides the gradient second percent transmittance when the optical article is tested in the Behind the Windshield Test, and the second layer provides the uniform first percent transmittance when the photochromic article is tested in the Outdoor Test.

Clause 4: The optical article of clause 3, wherein the first photochromic material has a first unactivated state absorbance of greater than 0 over at least a portion of wavelengths from 375 nm to 450 nm, and the first unactivated state terminal minimum absorbance wavelength is greater than 400 nm, and the second photochromic material has a second unactivated state absorbance of greater than zero over at least a portion of wavelengths from 340 nm to less than 420 nm, and the second unactivated state terminal minimum absorbance wavelength is less than or equal to 415 nm.

Clause 5: The optical article of clause 4, wherein the first unactivated state terminal minimum absorbance is greater than 400 nm and less than or equal to 450 nm, and the second unactivated state terminal minimum absorbance is greater than 375 nm and less than or equal to 415 nm.

Clause 6: The optical article of any one of clauses 3 to 5, wherein the first layer has a gradient pattern of the first photochromic material, wherein the gradient pattern comprises a gradient thickness of the first photochromic material or a gradient concentration of the first photochromic material.

Clause 7: The optical article of any one of clauses 3 to 6, wherein the first photochromic material is selected from the group consisting of a first photochromic compound, a first photochromic-dichroic compound, and combinations thereof, and the second photochromic material is selected from the group consisting of a second photochromic compound, a second photochromic-dichroic compound, and combinations thereof.

Clause 8: The optical article of clause 7, wherein at least one of the first photochromic-dichroic compound is at least partially aligned, or the second photochromic-dichroic compound is at least partially aligned, or the first photochromic-dichroic compound and the second photochromic-dichroic compound are each independently at least partially aligned.

Clause 9: The optical article of any one of clauses 3 to 8, wherein the first layer and the second layer each independently further comprise at least one additive selected from dyes, alignment promoters, kinetic enhancing additives, photoinitiators, thermal initiators, polymerization inhibitors, solvents, light stabilizers, heat stabilizers, mold release agents, rheology control agents, leveling agents, free radical scavengers, adhesion promoters, blue light blockers, or combinations of two or more thereof.

Clause 10: The optical article of any one of clauses 3 to 9, wherein the first photochromic material and said second photochromic material are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations of two or more thereof.

Clause 11: The optical article of clauses 7 or 8, wherein the first photochromic-dichroic compound comprises a first photochromic moiety, and the second photochromic-dichroic compound comprises a second photochromic moiety, wherein the first photochromic moiety and the second photochromic moiety are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations of two or more thereof.

Clause 12: The optical article of any one of clauses 3 to 11, further comprising at least one of: a primer layer; a topcoat layer; a hard coat layer; one or more antireflective layers; one or more alignment layers; or combinations thereof.

Clause 13: The optical article of any one of clauses 3 to 12, wherein the substrate comprises a first surface and a second surface, wherein the first surface and the second surface are opposed to each other, the first layer is positioned over at least a portion of the first surface of the substrate, and the optical article further comprises a back-layer comprising an ultraviolet light absorber, wherein the back-layer is positioned over at least a portion of the second surface of the substrate.

Clause 14: The optical article of any one of clauses 2 to 13, wherein the optical article is selected from ophthalmic articles, display articles, windows, mirrors, and active liquid crystal cell articles, and passive liquid crystal cell articles.

Clause 15: The optical article of clause 14, wherein the optical article is selected from ophthalmic articles, and said ophthalmic articles are selected from corrective lenses, non-corrective lenses, contact lenses, intra-ocular lenses, magnifying lenses, protective lenses, and visors.

Clause 16: An optical article that exhibits a uniform first percent transmittance when directly exposed to actinic radiation; a gradient second percent transmittance when the optical article is exposed to actinic radiation that has passed through a radiation attenuating transparency; and a uniform third percent transmittance when the optical article is free of exposure to actinic radiation, wherein the uniform first percent transmittance is less than the uniform third percent transmittance.

Clause 17: The optical article of clause 16, wherein the optical article is a photochromic optical article.

Clause 18: The optical article of clauses 16 or 17 comprising:

(a) a substrate;

(b) a first layer positioned over the substrate, the first layer comprising a first photochromic material having a first unactivated state terminal minimum absorbance wavelength; and (c) a second layer positioned over the first layer, the second layer comprising a second photochromic material having a second unactivated state terminal minimum absorbance wavelength, wherein the second unactivated state terminal minimum absorbance wavelength is less than the first unactivated state terminal minimum absorbance wavelength.

Clause 19: The optical article of clause 18, wherein the first photochromic material has a first unactivated state absorbance of greater than 0 over at least a portion of wavelengths from 375 nm to 450 nm, and the first unactivated state terminal minimum absorbance wavelength is greater than 400 nm, and/or the second photochromic material has a second unactivated state absorbance of greater than zero over at least a portion of wavelengths from 340 nm to less than 420 nm, and the second unactivated state terminal minimum absorbance wavelength is less than or equal to 415 nm.

Clause 20: The optical article of clause 19, wherein
the first unactivated state terminal minimum absorbance is greater than 400 nm and less than or equal to 450 nm, and
the second unactivated state terminal minimum absorbance is greater than 375 nm and less than or equal to 415 nm.

Clause 21: The optical article of any one of clauses 18 to 20, wherein the first layer has a gradient pattern of the first photochromic material, wherein the gradient pattern comprises a gradient thickness of the first photochromic material or a gradient concentration of the first photochromic material.

Clause 22: The optical article of any one of clauses 18 to 21, wherein
the first photochromic material is selected from the group consisting of a first photochromic compound, a first photochromic-dichroic compound, or combinations thereof, and
the second photochromic material is selected from the group consisting of a second photochromic compound, a second photochromic-dichroic compound, or combinations thereof.

Clause 23: The optical article of clause 22, wherein at least one of: the first photochromic-dichroic compound is at least partially aligned, or the second photochromic-dichroic compound is at least partially aligned, or the first photochromic-dichroic compound and the second photochromic-dichroic compound are each independently at least partially aligned.

Clause 24: The optical article of any one of clauses 18 to 23, wherein the first layer and the second layer each independently further comprise at least one additive selected from dyes, alignment promoters, kinetic enhancing additives, photoinitiators, thermal initiators, polymerization inhibitors, solvents, light stabilizers, heat stabilizers, mold release agents, rheology control agents, leveling agents, free radical scavengers, adhesion promoters, blue light blockers, or combinations of two or more thereof.

Clause 25: The optical article of any one of clauses 18 to 24, wherein the first photochromic material and said second photochromic material are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations of two or more thereof.

Clause 26: The optical article of clauses 22 or 23, wherein the first photochromic-dichroic compound comprises a first photochromic moiety, and the second photochromic-dichroic compound comprises a second photochromic moiety, wherein the first photochromic moiety and the second photochromic moiety are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations of two or more thereof.

Clause 27: The optical article of any one of clauses 18 to 26, further comprising at least one of: a primer layer; a topcoat layer; a hard coat layer; one or more antireflective layers; one or more alignment layers; or combinations thereof.

Clause 28: The optical article of any one of clauses 18 to 27, wherein
the substrate comprises a first surface and a second surface, wherein the first surface and the second surface are opposed to each other,
the first layer is positioned over at least a portion of the first surface of the substrate, and
the optical article further comprises a back-layer comprising an ultraviolet light absorber, wherein the back-layer is positioned over at least a portion of the second surface of the substrate.

Clause 29: The optical article of any one of clauses 18 to 28, wherein the optical article is selected from ophthalmic articles, display articles, windows, mirrors, active liquid crystal cell articles, or passive liquid crystal cell articles.

Clause 30: The optical article of clause 29, wherein the optical article is selected from ophthalmic articles, and said ophthalmic articles are selected from corrective lenses, non-corrective lenses, contact lenses, intra-ocular lenses, magnifying lenses, protective lenses, or visors.

Clause 31: An optical article, comprising:
(a) a substrate;
(b) a first layer positioned over at least a portion of the substrate, the first layer comprising a first portion including a first photochromic material and a second portion free of photochromic material, wherein the first portion has a gradient of the first photochromic material; and
(c) a second layer positioned over the first layer, the second layer comprising a second photochromic material, wherein the second layer has a substantially uniform concentration of the second photochromic material.

Clause 32: The optical article of clause 31, wherein
the first photochromic material has a first unactivated state absorbance of greater than 0 over at least a portion of wavelengths from 375 nm to 450 nm, and the first unactivated state terminal minimum absorbance wavelength is greater than 400 nm, and/or
the second photochromic material has a second unactivated state absorbance of greater than zero over at least a portion of wavelengths from 340 nm to less than 420 nm, and the second unactivated state terminal minimum absorbance wavelength is less than or equal to 415 nm.

Clause 33: The optical article of clause 32, wherein
the first unactivated state terminal minimum absorbance is greater than 400 nm and less than or equal to 450 nm, and
the second unactivated state terminal minimum absorbance is greater than 375 nm and less than or equal to 415 nm.

Clause 34: The optical article of any one of clauses 31 to 33, wherein the first layer has a gradient pattern of the first photochromic material, wherein the gradient pattern comprises a gradient thickness of the first photochromic material or a gradient concentration of the first photochromic material.

Clause 35: The optical article of any one of clauses 31 to 34, wherein
the first photochromic material is selected from the group consisting of a first photochromic compound, a first photochromic-dichroic compound, or combinations thereof, and
the second photochromic material is selected from the group consisting of a second photochromic compound, a second photochromic-dichroic compound, or combinations thereof.

Clause 36: The optical article of clause 35, wherein at least one of the first photochromic-dichroic compound is at least partially aligned, or the second photochromic-dichroic compound is at least partially aligned, or the first photochromic-dichroic compound and the second photochromic-dichroic compound are each independently at least partially aligned.

Clause 37: The optical article of any one of clauses 31 to 36, wherein the first layer and the second layer each independently further comprise at least one additive selected from dyes, alignment promoters, kinetic enhancing additives, photoinitiators, thermal initiators, polymerization inhibitors, solvents, light stabilizers, heat stabilizers, mold release agents, rheology control agents, leveling agents, free radical scavengers, adhesion promoters, blue light blockers, or combinations of two or more thereof.

Clause 38: The optical article of any one of clauses 31 to 37, wherein the first photochromic material and said second photochromic material are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations of two or more thereof.

Clause 39: The optical article of clauses 35 or 36, wherein the first photochromic-dichroic compound comprises a first photochromic moiety, and the second photochromic-dichroic compound comprises a second photochromic moiety, wherein the first photochromic moiety and the second photochromic moiety are each independently selected from indeno-fused naphthopyrans, naphtho[1,2-b]pyrans, naphtho[2,1-b]pyrans, spirofluoroeno[1,2-b]pyrans, phenanthropyrans, quinolinopyrans, fluoroanthenopyrans, spiropyrans, benzoxazines, naphthoxazines, spiro(indoline)naphthoxazines, spiro(indoline)pyridobenzoxazines, spiro(indoline)fluoranthenoxazines, spiro(indoline)quinoxazines, fulgides, fulgimides, diarylethenes, diarylalkylethenes, diarylalkenylethenes, and combinations of two or more thereof.

Clause 40: The optical article of any one of clauses 31 to 39, further comprising at least one of: a primer layer; a topcoat layer; a hard coat layer; one or more antireflective layers; one or more alignment layers; or combinations thereof.

Clause 41: The optical article of any one of clauses 31 to 40, wherein
the substrate comprises a first surface and a second surface, wherein the first surface and the second surface are opposed to each other,
the first layer is positioned over at least a portion of the first surface of the substrate, and
the optical article further comprises a back-layer comprising an ultraviolet light absorber, wherein the back-layer is positioned over at least a portion of the second surface of the substrate.

Clause 42: The optical article of any one of clauses 31 to 41, wherein the optical article is selected from ophthalmic articles, display articles, windows, mirrors, active liquid crystal cell articles, or passive liquid crystal cell articles.

Clause 43: The optical article of clause 42, wherein the optical article is selected from ophthalmic articles, and said ophthalmic articles are selected from corrective lenses, non-corrective lenses, contact lenses, intra-ocular lenses, magnifying lenses, protective lenses, or visors.

Clause 44: A method of making an optical article, comprising:
(a) applying a first layer comprising a gradient pattern of a first photochromic material over at least a portion of a substrate; and
(b) applying a second layer comprising a second photochromic material over at least a portion of the first layer to form a second layer, wherein the second layer has a substantially uniform concentration of the second photochromic material.

Clause 45: The method of clause 44, wherein the gradient pattern comprises a thickness gradient of the first photochromic material.

Clause 46: The method of clause 44, wherein the gradient pattern comprises a concentration gradient of the first photochromic material.

The present invention has been described with reference to specific details of particular embodiments thereof. It is not intended that such details be regarded as limitations upon the scope of the invention except insofar as and to the extent that they are included in the accompanying claims.

What is claimed is:
1. An optical article that exhibits:
a uniform first percent transmittance when said optical article is tested in the Outdoor Test,
a gradient second percent transmittance when said optical article is tested in the Behind the Windshield Test, and
a uniform third percent transmittance when said optical article is free of exposure to actinic radiation,
wherein said uniform first percent transmittance is less than said uniform third percent transmittance,
the optical article comprising:
(a) a substrate;
(b) a first layer positioned over at least a portion of said substrate, said first layer comprising a first photochromic material having a first unactivated state terminal minimum absorbance wavelength; and
(c) a second layer positioned over at least a portion of said first layer, said second layer comprising a second photochromic material having a second unactivated state terminal minimum absorbance wavelength,
wherein said second unactivated state terminal minimum absorbance wavelength is less than said first unactivated state terminal minimum absorbance wavelength, and
wherein said first layer provides said gradient second percent transmittance when said photochromic article is tested in the Behind the Windshield Test, and said second layer provides said uniform first percent transmittance when said photochromic article is tested in the Outdoor Test.

2. The optical article of claim 1, wherein said optical article is a photochromic optical article.

3. The optical article of claim 1, wherein
said first photochromic material has a first unactivated state absorbance of greater than 0 over at least a portion of wavelengths from 375 nm to 450 nm, and said first unactivated state terminal minimum absorbance wavelength is greater than 400 nm, and
said second photochromic material has a second unactivated state absorbance of greater than zero over at least a portion of wavelengths from 340 nm to less than 420 nm, and said second unactivated state terminal minimum absorbance wavelength is less or equal to than 415 nm.

4. The optical article of claim 3, wherein
said first unactivated state terminal minimum absorbance is greater than 415 nm and less than or equal to 450 nm, and
said second unactivated state terminal minimum absorbance is greater than 375 nm and less than or equal to 415 nm.

5. The optical article of claim 1, wherein said first layer has a gradient pattern of said first photochromic material.

6. The optical article of claim 1, wherein
said first photochromic material is selected from the group consisting of a first photochromic compound, a first photochromic-dichroic compound, and combinations thereof, and
said second photochromic material is selected from the group consisting of a second photochromic compound, a second photochromic-dichroic compound, and combinations thereof.

7. The optical article of claim 6, wherein at least one of:
said first photochromic-dichroic compound is at least partially aligned, or
said second photochromic-dichroic compound is at least partially aligned, or
said first photochromic-dichroic compound and said second photochromic-dichroic compound are each independently at least partially aligned.

8. The optical article of claim 1, wherein said first layer and said second layer each independently further comprise at least one additive selected from dyes, alignment promoters, kinetic enhancing additives, photoinitiators, thermal initiators, polymerization inhibitors, solvents, light stabilizers, heat stabilizers, mold release agents, rheology control agents, leveling agents, free radical scavengers, adhesion promoters, blue light blockers, or combinations of two or more thereof.

9. The optical article of claim 1, wherein said first photochromic material and said second photochromic material are each independently selected from indeno-fused naphthopyrans, naphtho [1,2-b]pyrans, naphtho [2,1-b] pyrans, spirofluoroeno [1,2-b]pyrans, phenanthropyrans, quinolinopyrans, fluoroanthenopyrans, spiropyrans, benzoxazines, naphthoxazines, spiro (indoline) naphthoxazines, spiro (indoline) pyridobenzoxazines, spiro (indoline) fluoranthenoxazines, spiro (indoline) quinoxazines, fulgides, fulgimides, diarylethenes, diarylalkylethenes, diarylalkenylethenes, or combinations of two or more thereof.

10. The optical article of claim 1, further comprising at least one of: a primer layer; a topcoat layer; a hard coat layer; one or more antireflective layers; one or more alignment layers; or combinations thereof.

11. The optical article of claim 1, wherein
said substrate comprises a first surface and a second surface, wherein said first surface and said second surface are opposed to each other,
said first layer is positioned over at least a portion of said first surface of said substrate, and
said optical article further comprises a back-layer comprising an ultraviolet light absorber, wherein said back-layer is positioned over at least a portion of said second surface of said substrate.

12. The optical article of claim 1, wherein said optical article is selected from ophthalmic articles, display articles, windows, mirrors, active liquid crystal cell articles, or passive liquid crystal cell articles.

13. The optical article of claim 12, wherein said optical article is selected from ophthalmic articles, and said ophthalmic articles are selected from corrective lenses, non-corrective lenses, contact lenses, intra-ocular lenses, magnifying lenses, protective lenses, or visors.

14. A method of making the optical article of claim 1, comprising:
(a) applying the first layer comprising a gradient pattern of the first photochromic material over at least a portion of the substrate; and
(b) applying the second layer comprising the second photochromic material over at least a portion of the first layer to form the second layer, wherein the second layer has a substantially uniform concentration of the second photochromic material.

* * * * *

UNITED STATES PATENT AND TRADEMARK OFFICE
CERTIFICATE OF CORRECTION

PATENT NO. : 12,242,090 B2
APPLICATION NO. : 17/613712
DATED : March 4, 2025
INVENTOR(S) : Sandrine Guillermin et al.

Page 1 of 1

It is certified that error appears in the above-identified patent and that said Letters Patent is hereby corrected as shown below:

In the Claims

Column 23, Line 14, Claim 3, delete "less or equal to than" and insert -- less than or equal to --

Column 24, Lines 7-8, Claim 9, delete "naphtho [1,2-b]pyrans, naphtho [2,1-b]pyrans, spirofluoroeno [1,2-b]pyrans," insert -- naphtho[1,2-b]pyrans, naphtho[2,1-b]pyrans, spirofluoroeno[1,2-b]pyrans, --

Column 24, Lines 10-12, Claim 9, delete "spiro (indoline) naphthoxazines, spiro (indoline) pyridobenzoxazines, spiro (indoline) fluoranthenoxazines, spiro (indoline) quinoxazines," and insert -- spiro(indoline)naphthoxazines, spiro(indoline)pyridobenzoxazines, spiro(indoline)fluoranthenoxazines, spiro(indoline)quinoxazines, --

Signed and Sealed this
Thirteenth Day of May, 2025

Coke Morgan Stewart
*Acting Director of the United States Patent and Trademark Office*